United States Patent Office 3,548,003

Patented Dec. 15, 1970

1

2

3,548,003

TRIS[TRIS(DIFLUORAMINO)METHOXY METHYL]PHOSPHINE OXIDE

Charles Wiener, Linden, and Ralph J. Leary, Cranford, N.J., assignors to Esso Research and Engineering Company, a corporation of Delaware

No Drawing. Filed Feb. 18, 1964, Ser. No. 346,383

Int. Cl. C07c *87/22*

U.S. Cl. 260—584 5 Claims

ABSTRACT OF THE DISCLOSURE

This invention relates to a novel prototype solid oxidizer identified as having the composition of tris[tris(difluoramino)methoxy methyl]phosphine oxide, which is represented by the formula: $[(NF_2)_3COCH_2]_3P{=}O$.

The present invention provides a method for preparing a high-energy oxidizing material useful in solid rocket propellant compositions by suitable reactions of hydroxyalkyl phosphonium salts with perfluoroguanidine to substitute the radical $(NHF)C(NF_2)_2$— for the hydrogen of the hydroxy groups followed by fluorination to form the —$C(NF_2)_3$ grouping.

The reactants employed are substances which are known in accordance with the prior art, i.e., the phosphonium salts and the perfluoroguanidine.

The perfluoroguanidine, which is less well known, is synthesized by fluorinating a salt of guanidine, e.g., guanidine carbonate dissolved in distilled water at an adjusted pH, preferably 5 to 6, by addition of aqueous HF and the reaction proceeds in accordance with the following equation:

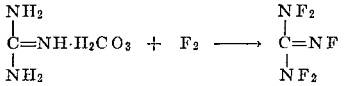

The reaction of the hydroxyalkyl phosphonium salts with perfluoroguanidine is carried out preferably in the presence of a solvent, such as acetonitrile and in the presence of a catalyst such as urea at a reaction temperature in the range of —20° C. to 150° C., preferably at an ambient temperature in the range of 20° C. to 30° C. Care is taken to avoid carrying out the reaction at elevated temperatures for safety. In the reactions from 5 to 10 moles of perfluoroguanidine were used per mole of the phosphonium salt to obtain the intermediate product in which the perfluoroguanidine radical is substituted for the hydrogen of the hydroxy group. Fluorination of this intermediate product is performed at low temperatures, at —30° C. to 0° C., using fluorine diluted by an inert gas such as helium or nitrogen. The reaction mixture is then concentrated by using a stream of dry nitrogen to remove the solvent or diluent, and the concentrate can then be crystallized or separated into fractions by column chromatography using silica gel and an elutrient liquid such as a mixture of acetonitrile, chloroform, and hexane.

Specific examples on preferred methods of forming the desired oxidizer with a description of the properties of the product and its merits are given as follows.

EXAMPLE 1

A reaction vessel containing 0.1 mmole of urea catalyst in 1 ml. of $CH_3CN$ solvent was charged with 0.8 mmole of tetrakis(hydroxymethyl)phosphonium chloride. The mixture was then cooled to —128° C. and evacuated to 0.001 mmole of Hg and 6.7 mmoles of perfluoroguanidine were distilled into the vessel. The mixture was allowed to react at 25° C. for 4 days with stirring. At the end of this period the reaction mixture was cooled to —78° C. and the excess perfluoroguanidine was removed by distillation to a trap cooled to —128° C. The mixture was allowed to warm to 0° C. and 10% fluorine gas in helium was then passed over it for one hour while maintaining the temperature at 0° C. by means of an ice bath. The product mixture was concentrated by passing a stream of dry nitrogen over it and the concentrate was then placed onto a silica gel column where it was elutriated with a liquid mixture of acetonitrile-chloroform-hexane mixture in a liquid volume ratio of 4:5:91. White crystals were collected upon evaporation of the early fractions collected from the column. These white crystals were found to have a melting point of 193° C. to 194° C. The white crystal product was analyzed and found to be tris[tris(difluoramino)methoxy methyl]phosphine oxide having the following structure:

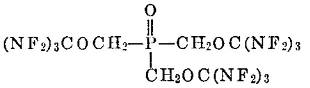

*Elemental analysis.*—Calculated for $C_6H_6PF_{18}N_9O_4$ (percent): C, 11.25; N, 19.68; F, 53.4. Found (percent): C, 12.22; N, 19.61; F, 51.8. Molecular weight: Calculated: 641. Found: 637.

The N.M.R. analysis is consistent with the structure given. Also infrared data confirms the structure assigned to the tris[tris(difluoramino)methoxy methyl]phosphine oxide.

Physical characteristics

Melting Point—193° C. to 194° C. (no apparent decomposition)

DTA Exotherm—225° C.

Vacuum Thermal Stability—6 cc./g. at 60° C. for 100 hours

The shape of the curve from the data indicates impurities may be responsible for gasing.

Solubility—Slight solubility in hexakis ($NF_2$) propylether and in tetrakis ($NF_2$) amyl acrylate polymer at temperatures up to 70° C. but no solubility noticeable at room temperature.

Shock sensitivity—about 10 kg. cm.

The DTA exotherm is the temperature to which the substance can be heated without decomposition or explosion. Based on the thermal stability of other compounds previously evaluated and found to have DTA exotherms exceeding 200° C., this compound should be quite thermally stable to at least 90° C. Precaution should be taken in handling the crystalline product to avoid detonations; however, it has been found that the product in a microcrystalline or fine powder, formed by flash evaporation of the volatile diluent from the tris[tris($NF_2$) methoxy methyl]phosphine oxide, was safely handled and was not unduly sensitive.

EXAMPLE 2

In another run carried out as in Example 1, 0.5 mmole urea catalyst was used in 5 ml. of acetonitrile solvent and the proportions of reactants admixed were 4.0 mmoles tetrakis(hydroxymethyl)phosphonium chloride with 33.5 mmoles of perfluoroguanidine. The reaction conditions were the same; 25° C. for a period of 4 days. The intermediate product obtained was fluorinated for 3 hours with $F_2$ in nitrogen. The fluorinated material was elutriated through a chromatographic column and a theoretical yield of 40% was obtained, based on the amount of the initial phosphonium salt reactant, $(HOCH_2)_4PCl$.

EXAMPLE 3

Using the same technique as in Example 1, 1 mmole of urea catalyst was used in 1 ml. $CH_3CN$ solvent and tetrakis(hydroxymethyl)phosphonium perchlorate was admixed in an amount of 0.8 mmole with 6.7 mmoles of perfluoroguanidine. The intermediate product was then fluorinated as in Example 1 and a crystalline product was obtained. This product was found to be similar in elemental analysis and structure analysis from that obtained from the phosphonium chloride.

The solid crystalline compound prepared in accordance with the examples given, represented by the formula: $[(NF_2)_3COCH_2]_3P=O$, was evaluated in a number of solid rocket propellant systems with tetrakis($NF_2$)amyl acrylate polymer as the binder and with other admixed oxidizers and with powdered boron as fuel to determine its effect on the specific impulse of the systems. The solid oxidizer product was found suitable for obtaining high $I_{sp}$ values above 290 as shown in the following formulations.

TABLE I

| | Wt. percent | | |
|---|---|---|---|
| Acrylate polymer binder $[C_8H_{10}O_2(NF_2)_4]_n$ | 20.0 | 27.5 | 20.0 |
| Hexakis($NF_2$)propyl ether | | | 20.0 |
| $(NF_2)_3COCH_2C(NO_2)_3$ | 20.0 | 27.5 | ----- |
| $[(NF_2)_3COCH_2]_3P=O$ | 48.0 | 35.0 | 42.0 |
| $N_2H_4(2HClO_4)$ | 8.5 | 8.0 | ----- |
| $NH_4ClO_4$ | | | 16.0 |
| Boron | 3.5 | 2.0 | 2.0 |
| $I_{sp}$ | 293.8 | 291.0 | 285.4 |

The compound 1-tris($NF_2$)methoxy-2,2,2-trinitroethane having the formula $(NF_2)_3COCH_2C(NO_2)_3$ serves as a good plasticizer with the hexakis($NF_2$)amyl acrylate polymer binder and at the 40% plasticized binder level gives the 293.8 impulse with the 48% of the solid oxidizer made as described from the hydroxy alkyl phosphonium salts. In this composition hydrazinium diperchlorate is used as a solid oxidizer which supplies oxygen, and powdered boron is used as a fuel.

Various modifications may be made in the selection of the phosphonium salt for altering characteristics of the resulting oxidizer product, such as increased solubility by having longer alkyl groups, and the alkyl groups may contain $NF_2$ substituent groups. The hydroxy methyl phosphonium salts are useful for obtaining a high $NF_2$-content which gives the higher energy value.

The invention described is claimed as follows:

1. The compound tris[tris(difluoramino)methoxy methyl]phosphine oxide having the formula:

$$[(NF_2)_3COCH_2]_3P=O$$

2. Method of preparing a high energy oxidizer which comprises reacting a hydroxy alkyl phosphonium salt with perfluoroguanidine at a temperature in the range of −20° C. to 150° C. for a period to form a resulting substitution product, separating excess perfluoroguanidine from said substitution product and fluorinating the substitution product with fluorine, and recovering the resulting fluorinated product.

3. Method of preparing the compound tris[tris(difluoramino)methoxy methyl]phosphine oxide which comprises reacting tetrakis(hydroxymethyl) phosphonium salt with perfluoroguanidine at a temperature in the range of −20° C. to 150° C. for a period to form a substitution product of the perfluoroguanidine radical for hydrogen of the hydroxy groups in the phosphonium salt, then fluorinating said substitution product and recovering the resulting fluorinated substitute.

4. Method of preparing tris[tris(difluoramino)methoxy methyl]phosphine oxide which comprises reacting tetrakis(hydroxymethyl)phosphonium chloride with perfluoroguanidine to form a resulting substitution product in which the perfluoroguanidine radical $(NHF)C(NF_2)_2$— is substituted for hydrogen of the hydroxy groups in the phosphonium chloride, removing excess perfluoroguanidine from the substitution product and fluorinating the substitution product with fluorine gas to obtain the phosphine oxide which is then recovered.

5. Method of preparing tris[tris(difluoramino)methoxy methyl]phosphine oxide which comprises reacting tetrakis(hydroxy methyl)phosphonium perchlorate with perfluoroguanidine to form a resulting substitution product in which the perfluoroguanidine radical $(NHF)C(NF_2)_2$— is substituted for hydrogen of the hydroxy groups in the phosphonium chloride, removing excess perfluoroguanidine from the substitution product and fluorinating the substitution product with fluorine gas to obtain the phosphine oxide which is then recovered.

References Cited

Lawton et al., J. Am. Chem. Soc., vol. 81, p. 4755 (1959).

LELAND A. SEBASTIAN, Primary Examiner

U.S. Cl. X.R.

149—19, 22, 36; 260—564